US009225141B2

(12) United States Patent
Tsuchida et al.

(10) Patent No.: US 9,225,141 B2
(45) Date of Patent: Dec. 29, 2015

(54) MULTI-CORE AMPLIFICATION OPTICAL FIBER AND MULTI-CORE OPTICAL FIBER AMPLIFIER

(71) Applicant: FURUKAWA ELECTRIC CO., LTD., Tokyo (JP)

(72) Inventors: Yukihiro Tsuchida, Tokyo (JP); Koichi Maeda, Tokyo (JP); Yu Mimura, Tokyo (JP); Hiroshi Matsuura, Tokyo (JP); Kengo Watanabe, Tokyo (JP); Tsunetoshi Saito, Tokyo (JP); Ryo Miyabe, Tokyo (JP); Shigeto Matsumoto, Tokyo (JP); Keiichi Aiso, Tokyo (JP); Ryuichi Sugizaki, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 14/245,672

(22) Filed: Apr. 4, 2014

(65) Prior Publication Data

US 2014/0240819 A1    Aug. 28, 2014

Related U.S. Application Data

(63) Continuation of application No. PCT/JP2012/075821, filed on Oct. 4, 2012.

(60) Provisional application No. 61/543,109, filed on Oct. 4, 2011, provisional application No. 61/643,970, filed on May 8, 2012, provisional application No. 61/700,658, filed on Sep. 13, 2012.

(51) Int. Cl.
*H01S 3/094* (2006.01)
*H01S 3/067* (2006.01)
(Continued)

(52) U.S. Cl.
CPC ........ *H01S 3/06708* (2013.01); *G02B 6/02042* (2013.01); *H01S 3/06737* (2013.01);
(Continued)

(58) Field of Classification Search
CPC ............ G02B 6/02042; H01S 3/06766; H01S 3/06754; H01S 3/06708; H01S 3/06737
See application file for complete search history.

(56) References Cited

U.S. PATENT DOCUMENTS 5,706,124 A * 1/1998 Imoto et al. ................ 359/337.1
5,712,941 A   1/1998 Imoto et al.
(Continued)

FOREIGN PATENT DOCUMENTS

EP    2 369 376 A2    9/2011
EP    2 722 943 A1    4/2014
(Continued)

OTHER PUBLICATIONS

U.S. Appl. No. 14/106,338, filed Dec. 13, 2013, Tsuchida, et al.
(Continued)

*Primary Examiner* — Eric Bolda
(74) *Attorney, Agent, or Firm* — Oblon, McClelland, Maier & Neustadt, L.L.P.

(57) ABSTRACT

A multi-core amplification optical fiber includes a plurality of rare-earth-doped core portions and a cladding portion positioned at an outer periphery of the core portions and having refractive index lower than those of the core portions. When a doping concentration of the rare-earth of each of the core portions is 250 ppm to 2000 ppm, a relative refractive index difference of each of the core portions relative to the cladding portion is 0.5% to 2% at a wavelength of 1550 nm, and a core diameter of each of the core portions is 1 μm to 5 μm, a separation distance between each of the core portions and adjacent one of the core portions is set at equal to or larger than 30 μm and at equal to or smaller than 60 μm so that a light-crosstalk between the adjacent core portions is equal to or lower than −30 dB.

10 Claims, 14 Drawing Sheets

(51) Int. Cl.
*G02B 6/02* (2006.01)
*H04J 14/02* (2006.01)
*H04J 14/04* (2006.01)
*H01S 3/0941* (2006.01)
*H01S 3/16* (2006.01)
*H01S 3/23* (2006.01)
*H01S 3/00* (2006.01)

(52) U.S. Cl.
CPC ............. *H01S3/06754* (2013.01); *H04J 14/02* (2013.01); *H04J 14/04* (2013.01); *H01S 3/0064* (2013.01); *H01S 3/09415* (2013.01); *H01S 3/094061* (2013.01); *H01S 3/1608* (2013.01); *H01S 3/2383* (2013.01); *H01S 2301/02* (2013.01); *H01S 2301/04* (2013.01)

(56) References Cited

U.S. PATENT DOCUMENTS

| | | | |
|---|---|---|---|
| 6,055,353 | A | 4/2000 | Aiso |
| 6,097,868 | A * | 8/2000 | Tardy ............... G02B 6/020242 385/126 |
| 6,463,201 | B2 | 10/2002 | Aiso et al. |
| 6,903,866 | B2 | 6/2005 | Aiso |
| 7,079,738 | B2 | 7/2006 | Nakamura et al. |
| 7,126,748 | B2 | 10/2006 | Sugizaki et al. |
| 7,206,486 | B2 | 4/2007 | Moriai et al. |
| 7,289,707 | B1 * | 10/2007 | Chavez-Pirson ......... G02B 6/06 385/116 |
| 7,418,178 | B2 | 8/2008 | Kudou et al. |
| 7,466,479 | B2 | 12/2008 | Aiso |
| 8,315,494 | B2 | 11/2012 | Tsuchida et al. |
| 8,537,458 | B2 | 9/2013 | Yamanashi et al. |
| 8,737,793 | B2 * | 5/2014 | Imamura ........................ 385/126 |
| 2002/0003937 | A1 | 1/2002 | Aiso |
| 2011/0206331 | A1 | 8/2011 | Imamura et al. |
| 2011/0222828 | A1 | 9/2011 | Sasaoka et al. |
| 2011/0274398 | A1 * | 11/2011 | Fini et al. ....................... 385/124 |
| 2012/0134637 | A1 | 5/2012 | Imamura |
| 2013/0336343 | A1 | 12/2013 | Miyabe et al. |
| 2014/0010500 | A1 | 1/2014 | Saito et al. |
| 2014/0010501 | A1 | 1/2014 | Saito et al. |

FOREIGN PATENT DOCUMENTS

| | | |
|---|---|---|
| JP | 62-047604 A | 3/1987 |
| JP | 9-139534 A | 5/1997 |
| JP | 10-125988 A | 5/1998 |
| JP | 11-095049 A | 4/1999 |
| JP | 2008-116745 A | 5/2008 |
| JP | 2011-170062 A | 9/2011 |
| JP | 2011-209702 A | 10/2011 |
| WO | WO 2010/119930 A1 | 10/2010 |
| WO | WO 2011/114795 A1 | 9/2011 |

OTHER PUBLICATIONS

U.S. Appl. No. 14/107,928, filed Dec. 16, 2013, Mimura, et al.
International Search Report issued Oct. 30, 2012 in PCT/JP2012/075821.
Office Action issued May 21, 2013 in Japanese Patent Application No. 2013-506379 (with English language translation).
Yu Mimura, et al., "Prospects and issues for multi-core optical fiber amplification techniques" Proceedings of the 2011 IEICE Communications Society Conference, Aug. 30, 2011, pp. SS-59 to SS-60.
Katsunori Imamura, et al., "Investigation of Multi-Core Fibers with Large Aeff and Low Micro Bending Loss" OSA/OFC/NFOEC, OWK6, 2010, 3 Pages.
Tetsuya Hayashi, et al., "Low-Crosstalk and Low-Loss Multi-Core Fiber Utilizing Fiber Bend" OSA/OFC/NFOEC, OWJ3, 2011, 3 Pages.
K. Takenaga, et al., "Reduction of Crosstalk by Trench-Assisted Multi-Core Fiber" OSA/OFC/NFOEC, OWJ4, 2011, 3 Pages.
K.S. Abedin, et al. "Amplification and noise properties of an erbium-doped multicore fiber amplifier" Optics Express, vol. 19, No. 17, Aug. 15, 2011, pp. 16715-16721.
K.S. Abedin, et al., "Cladding-pumped erbium-doped multicore fiber amplifier" Optics Express, vol. 20, No. 18, Aug. 27, 2012, pp. 20191-20200.
Extended European Search Report issued Oct. 13, 2015 in Patent Application No. 12837909.6.
Peter M. Krummrich, et al., "Evaluation of Potential Optical Amplifier Concepts for Coherent Mode Multiplexing", Optical Society of America, XP31946225, Mar. 2011, 3 pages.

* cited by examiner

MULTI-CORE AMPLIFICATION OPTICAL FIBER AND MULTI-CORE OPTICAL FIBER AMPLIFIER

CROSS-REFERENCE TO RELATED APPLICATION

This application is a continuation of PCT International Application No. PCT/JP2012/075821 filed on Oct. 4, 2012 which claims the benefit of priority from US Provisional Patent Application Nos. 61/543,109 filed on Oct. 4, 2011, 61/643,970 filed on Aug. 5, 2012 May 8, 2012, and 61/700,658 filed on Sep. 13, 2012, the entire contents of which are incorporated herein by reference.

BACKGROUND OF THE INVENTION

1. Field of the Invention

The present invention relates to a multi-core amplification optical fiber and a multi-core optical fiber amplifier using the same.

2. Description of the Related Art

Optical transmission using a multi-core optical fiber enables further expansion of transmission capacity by using spatial multiplexing technique, and therefore further research and development are undergoing in recent years (see K. Imamura et al., "Investigation on Multi-Core Fibers with Large $A_{eff}$ and Low Micro Bending Loss" OFC2010, OWK6 (2010), T. Hayashi et al., "Low-Crosstalk and Low-Loss Multi-Core Fiber Utilizing Fiber Bend" OFC2011, OWJ3 (2011), and K. Takenaga et al., "Reduction of Crosstalk by Trench-Assisted Multi-Core Fiber" OFC2011, OWJ4 (2011)). To date, transmission experiments using a multi-core optical fiber for transmission have been reported. However, mostly all of those relate to a transmission experiment in one span in which a length of 80 km of multi-core optical fiber is used.

An optical amplifier using a multi-core-type amplification optical fiber corresponding to a multi-core optical fiber for transmission is considered to be indispensable for extending transmission distance further (see Japanese Laid-open Patent Publication No. H10-125988). To date, as a multi-core Erbium-doped optical fiber amplifier (EDFA) has been reported by Abedin et al. of OFS Laboratories in U.S., research and development of the multi-core EDFA have been accelerated (K. S. Abedin et al., "Amplification and noise properties of an erbium-doped multicore fiber amplifier" Optics Express, vol. 19, pp. 16715-16721, 2011 and K. S. Abedin et al., "Cladding-pumped erbium-doped multicore fiber amplifier" Optics Express, vol. 20, pp. 20191-20200, 2012).

SUMMARY OF THE INVENTION

It is an object of the present invention to at least partially solve the problems in the conventional technology.

In accordance with one aspect of the present invention, a multi-core amplification optical fiber includes a plurality of core portions doped with a rare-earth element, and a cladding portion positioned at an outer periphery of each of the core portions and having refractive index lower than refractive index of each of the core portions, in which, when a concentration of the rare-earth element doped to each of the core portions is 250 ppm to 2000 ppm, a relative refractive index difference Δ of each of the core portions relative to the cladding portion is 0.5% to 2% at a wavelength of 1550 nm, and a core diameter of each of the core portions is 1 μm to 5 μm, a separation distance of each of the core portions from adjacent one of the core portions is set at equal to or larger than 30 μm and at equal to or smaller than 60 μm so that a crosstalk of light between the adjacent core portions is equal to or lower than −30 dB.

In accordance with another aspect of the present invention, a multi-core optical fiber amplifier uses a multi-core amplification optical fiber. The multi-core amplification optical fiber includes a plurality of core portions doped with a rare-earth element, and a cladding portion positioned at an outer periphery of each of the core portions and having refractive index lower than refractive index of each of the core portions, in which, when a concentration of the rare-earth element doped to each of the core portions is 250 ppm to 2000 ppm, a relative refractive index difference Δ of each of the core portions relative to the cladding portion is 0.5% to 2% at a wavelength of 1550 nm, and a core diameter of each of the core portions is 1 μm to 5 μm, a separation distance of each of the core portions from adjacent one of the core portions is set at equal to or larger than 30 μm and at equal to or smaller than 60 μm so that a crosstalk of light between the adjacent core portions is equal to or lower than −30 dB.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, embodiments of a multi-core amplification optical fiber and a multi-core optical fiber amplifier according to the present invention will be explained in detail with reference to the drawings. It should be noted that the invention is not limited by these embodiments. In addition, terms not defined in this specification is subject to definition and measurement method in International Telecommunication Union (ITU-T) G.650.1.

In the multi-core EDF disclosed by K. S. Abedin et al., "Amplification and noise properties of an erbium-doped multicore fiber amplifier" Optics Express, vol. 19, pp. 16715-16721, 2011, inter-core crosstalk of light is approximately −20 dB to −25 dB. However, study conducted by the inventers of the present application found a problem that a multi-core EDF, which is an optical amplification optical fiber used in a multi-core EDFA, may sometimes cause deterioration in quality of signal light since, in case that inter-core crosstalk of light is approximately −20 dB to −25 dB, a signal light propagating in a core affects a signal light propagating in another core.

In contrast, according to the present embodiments, an effect of capable of optical amplification while suppressing lowering of the quality in signal transmission is obtained.

Figure 1:
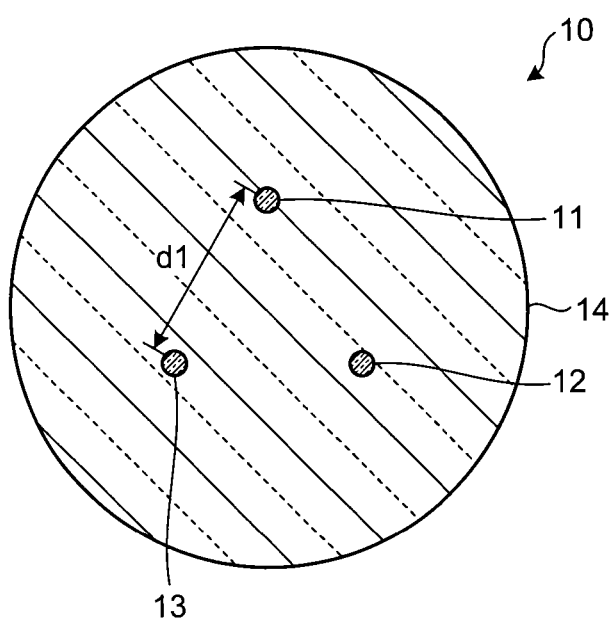
FIG. 1 is a schematic cross-sectional view of a multi-core amplification optical fiber according to an embodiment 1.

FIG. 1 is a schematic cross-sectional view of a multi-core amplification optical fiber according to the embodiment 1 of the present invention. As shown in FIG. 1, a multi-core amplification optical fiber 10 includes three core portions 11, 12, and 13 and a cladding portion 14 positioned at an outer periphery of each one of the core portions 11, 12, and 13.

The core portions 11, 12, and 13 are disposed around a center axis of the multi-core amplification optical fiber 10 and positioned approximately at lattice points of a regular-triangle-shaped triangular lattice. The core portions 11, 12, and 13 are made of silica glass containing dopant, such as germanium (Ge) or the like, which increases refractive index. The cladding portion 14 is made of pure silica glass not containing dopant which adjusts refractive index. As a result of that, refractive indices of the core portions 11, 12, and 13 are higher than that of the cladding portion 14.

In addition, the multi-core amplification optical fiber 10 is a multi-core EDF, and the core portions 11, 12, and 13 are doped with erbium (Er) as a rare-earth element. However, a rare-earth element to be doped with may be ytterbium (Yb), neodymium (Nd), thulium (Tm) or the like. The doping amount of Er is set so that a small signal gain coefficient for a signal light at a wavelength of 1550 nm is 11 dB/m, for example. In addition, core diameters and relative refractive index differences of the core portions 11, 12, and 13 are set so that, for example, a mode field diameter is 6.6 µm at a wavelength of 1580 nm, an effective core area is 35 µm² at a wavelength of 1580 nm, and a cut-off wavelength is 1005 nm.

As shown in FIG. 1, d1 indicates the separation distance (inter-core distance) between the core portion 11 and the core portion 13. The inter-core distances are identical as d1 between any pair of adjacent core portions 11, 12, and 13. In addition, the inter-core distance is a distance to the extent that the inter-core crosstalk of light does not affect optical characteristics of the respective core portions 11, 12, and 13. For example, the inter-core distance is set so that the crosstalk is equal to or lower than −30 dB, more preferably equal to or lower than −40 dB for a length of the multi-core amplification optical fiber 10 in use. As described above, in order to make the crosstalk between the core portions equal to or lower than −30 dB when the mode field diameter is 6.6 µm at the wavelength of 1580 nm, the effective core area is 35 µm² at the wavelength of 1580 nm, and the cut-off wavelength is 1005 nm, it is preferable to set the concentration of Er to be doped at 250 ppm to 2000 ppm, set relative refractive index difference Δ relative to the cladding portion 14 at a wavelength of 1550 nm at 0.5% to 2%, set the core diameter at 1 µm to 5 µm, and set the inter-core distance equal to or larger than 30 µm and equal to or smaller than 60 µm. Hereby the multi-core amplification optical fiber 10 is able to optically amplify signal lights inputted into the core portions 11, 12, and 13 while suppressing lowering of the quality of the signal lights. In addition, if the inter-core distance in the multi-core amplification optical fiber 10 is set at 30 µm, an outer diameter of the cladding portion 14 (optical fiber diameter) can be set at approximately 100 µm, which is approximately equal to or lower than a optical fiber diameter of a typical optical fiber of 125 µm.

It should be noted that, if the concentration of Er doping to the core portions 11, 12, and 13 is 250 ppm to 2000 ppm, an appropriate gain coefficient can be obtained and the concentration is appropriate for facilitating production of an optical fiber preform from which the multi-core amplification optical fiber 10 is produced. In addition, if the relative refractive index difference Δ of the core portions 11, 12, and 13 relative to the cladding portion 14 is 0.5% to 2% and the core diameter is 1 µm to 5 µm, cut-off wavelength at each of the core portions 11, 12, and 13 can be of an appropriate value for single mode transmission of a signal light in C-band (a wavelength range of approximately 1530 nm to 1560 nm). In addition, if the inter-core distance is equal to or larger than 30 µm and equal to or smaller than 60 µm, a desirable crosstalk value can be achieved and excessive expansion of the optical fiber diameter can be prevented.

Next, a multi-core optical fiber amplifier using the multi-core amplification optical fiber 10 according to the embodiment 1 shown in FIG. 1 will be described as an embodiment 2 of the present invention.

Figure 2:
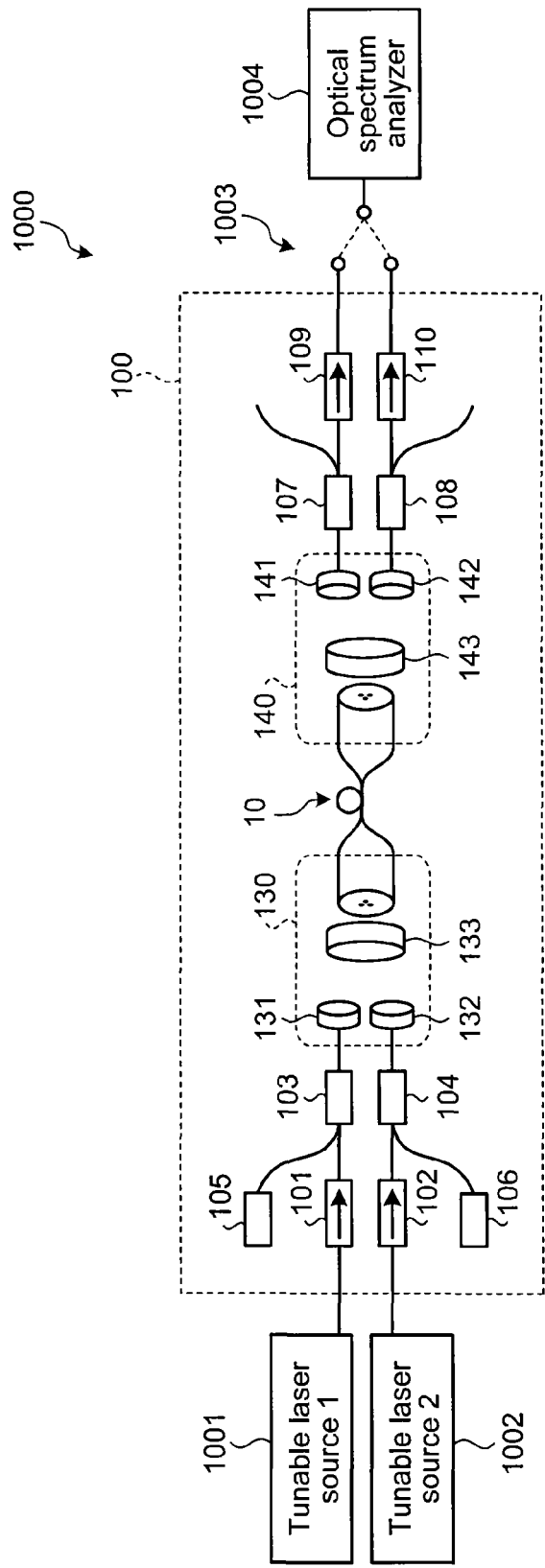
FIG. 2 is a schematic diagram of a multi-core optical fiber amplifier according to an embodiment 2 and a measurement system measuring its optical characteristics.

FIG. 2 is a schematic diagram of a multi-core optical fiber amplifier according to the present embodiment 2 and a measurement system measuring its optical characteristics. A multi-core optical fiber amplifier 100 includes optical isolators 101 and 102, wavelength division multiplexing (WDM) couplers 103 and 104, pumping laser diodes (LDs) 105 and 106 as pumping light sources, an optical coupler 130, the multi-core amplification optical fiber 10, an optical coupler 140, WDM couplers 107 and 108, and optical isolators 109 and 110.

In addition, a measurement system 1000 includes wavelength-tunable light sources 1001 and 1002, an optical selective switch 1003, and an optical spectrum analyzer 1004.

The optical isolator 101 receives a signal light (at a wavelength of, for example, 1520 nm to 1620 nm) outputted from the wavelength-tunable light source 1001 and outputs the received signal light to the WDM coupler 103. The WDM coupler 103 passes therethrough and outputs the signal light to the optical coupler 130. Similarly, the optical isolator 102 receives a signal light outputted by the wavelength-tunable light source 1002 and outputs the received signal light to the WDM coupler 104. The WDM coupler 104 passes therethrough and outputs the signal light to the optical coupler 130.

The pumping LDs 105 and 106 are, for example, semiconductor LDs and output single mode pumping lights at a wavelength of 1480 nm. It should be noted that, the pumping LDs 105 and 106 may be ones that output another wavelength, e.g. a wavelength of 980 nm, of pumping light capable of optical pumping of doped rare-earth element.

The WDM couplers 103 and 104 multiplex the respective pumping lights outputted from the pumping LDs 105 and 106 with the signal lights outputted from the variable wavelength light sources 1001 and 1002 and then output to output-side optical fiber ports of single mode optical fibers positioned at a right-hand side of the drawing with respect to the WDM couplers 103 and 104.

The optical coupler 130 is an optical coupler of a spatial coupling system, which is constituted by lenses 131 and 132 provided correspondingly to the output-side optical fiber ports of the WDM couplers 103 and 104 respectively and a lens 133 provided correspondingly to the multi-core amplification optical fiber 10.

The optical coupler 140 is an optical coupler of the spatial coupling system, which is constituted by a lens 143 provided correspondingly to the multi-core amplification optical fiber 10 and lenses 141 and 142 provided correspondingly to the input-side optical fiber ports of single mode optical fibers positioned at a left-hand side of the drawing with respect to the WDM couplers 107 and 108.

As described later, the WDM coupler 107 passes therethrough the signal light amplified by the multi-core amplification optical fiber 10 and outputs the signal light to the optical isolator 109. Similarly, the WDM coupler 108 passes therethrough the signal light amplified by the multi-core amplification optical fiber 10 and outputs the signal light to the optical isolator 110. The optical isolators 109 and 110 are connected to the optical selective switch 1003. The optical selective switch 1003 is configured to be capable of selecting one of the signal lights outputted from the optical isolators 109 and 110 arbitrarily and outputting the selected one of the signal lights to the optical spectrum analyzer 1004.

In the optical coupler 130, the lenses 131 and 132 collimate multiplexed lights of the signal lights and the pumping lights outputted from the respective output-side optical fiber ports of the WDM couplers 103 and 104.

The lens 133 is configured to condense the respective c multiplexed lights which are collimated to different core portions of the multi-core amplification optical fiber 10 and couple the condensed lights thereto optically. Hereby particular ones of the core portions of the multi-core amplification optical fiber 10 are pumped optically, and the optically pumped core portions propagate the signal lights while amplifying the signal lights optically. Thus, the multi-core optical fiber amplifier 100 adopts forward pumping scheme.

On the other hand, in the optical coupler 140, the lens 143 is configured to collectively collimate the signal lights amplified optically by the multi-core amplification optical fiber 10. The lens 141 condenses the collimated signal light to the input-side optical fiber port of the WDM coupler 107 to make the condensed signal light coupled optically. Similarly, the lens 142 condenses the collimated signal light to the input-side optical fiber port of the WDM coupler 108 to make the condensed signal light coupled optically. The WDM couplers 107 and 108 and the optical isolators 109 and 110 sequentially pass the signal lights coupled optically to the input-side optical fiber ports of the WDM couplers 107 and 108 and make the signal lights outputted from the multi-core optical fiber amplifier 100.

In addition, the optical selective switch 1003 selects one of the signal lights outputted from the optical isolators 109 and 110 arbitrarily and outputs the selected one of the signal lights to the optical spectrum analyzer 1004. Hereby the optical spectrum analyzer 1004 is capable of measuring a spectrum of the signal light inputted thereinto.

It should be noted that, although two core portions of the multi-core amplification optical fiber 10 are used for optical amplification in FIG. 2, it may be configured so that all of three core portions are used for optical amplification.

After that, a multi-core optical fiber amplifier and a measurement system configured similarly to FIG. 2 were produced, and optical amplification characteristics of the multi-core optical fiber amplifier were measured.

Figure 3:
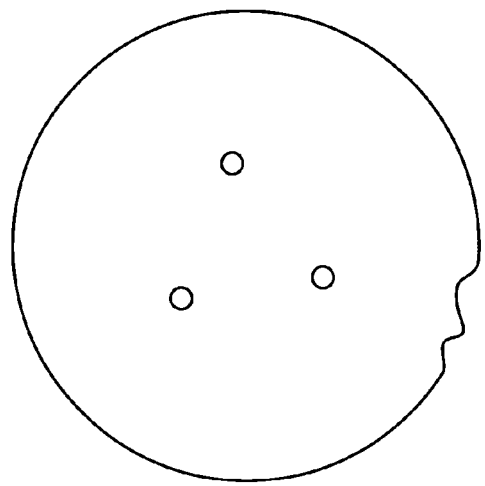
FIG. 3 is a drawing schematically showing a photographed cross section of a multi-core amplification optical fiber used for a produced multi-core optical fiber amplifier.

FIG. 3 is a drawing schematically showing a photographed cross section of the multi-core amplification optical fiber used for the produced multi-core optical fiber amplifier. The doping amount of Er of the multi-core amplification optical fiber was set so that small signal gain coefficient for a signal light at a wavelength of 1550 nm is 11 dB/m. In addition, core diameters and relative refractive index differences of the three core portions were set respectively so that a mode field diameter is 6.6 µm at a wavelength of 1580 nm, an effective core area is 35 µm$^2$ at a wavelength of 1580 nm, and a cut-off wavelength is 1005 nm. In addition, each of the inter-core distances was set at 30 µm. In addition, the length of the multi-core amplification optical fiber was set at 12 m.

The total of optical loss of the optical isolator, the WDM coupler, and the optical coupler relative to each of the signal light was 1.3 dB. In addition, when measuring optical amplification, a signal light at a wavelength of 1550 nm was inputted from one of wavelength-tunable light sources, and a signal light at a wavelength of 1551 nm was inputted from the other one of the wavelength-tunable light sources. Optical powers of the signal lights were set so that the optical powers of the signal lights inputted into the multi-core amplification optical fiber are −15 dBm. In addition, optical powers of pumping lights inputted into the multi-core amplification optical fiber were set at 15 mW and 12 mW respectively so that optical powers outputted from the multi-core amplification optical fiber after the optical amplification are 0 dBm.

It should be noted that, in the following description, in the multi-core amplification optical fiber, a core portion to which a signal light at a wavelength of 1550 nm is inputted is given a symbol of Core A, and a core portion to which a signal light at a wavelength of 1551 nm is inputted is given a symbol of Core B.

Figure 4:
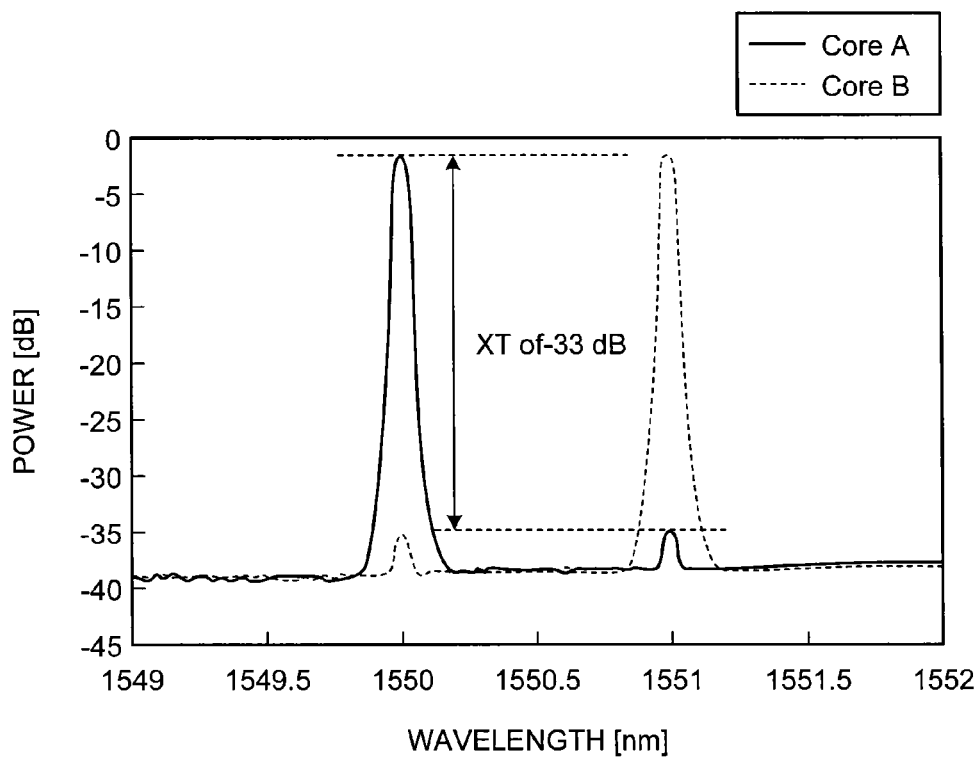
FIG. 4 is a drawing showing a power spectrum of outputted signal light when measuring optical amplification characteristics.

FIG. 4 is a drawing showing a power spectrum of the outputted signal light when measuring optical amplification characteristics. In FIG. 4, a solid line indicates a spectrum of a signal light outputted from Core A. A broken line indicates a spectrum of a signal light outputted from Core B. It should be noted that the vertical axis indicates relative power.

As shown in FIG. 4, for each signal light, due to crosstalk (XT) of light between the core portions, a signal light is outputted very slightly from a core portion different from the core portion into which the signal light was inputted. For example, although only a signal light at a wavelength of 1550 nm is inputted into Core A, a signal light inputted into Core B at a wavelength of 1551 nm is also outputted slightly on the spectrum of FIG. 4. However, the crosstalk of light was small in value, i.e., equal to or lower than −30 dB, specifically −33 dB, which is of no problem in practical use. It should be noted that, the crosstalk in FIG. 4 is of a value including crosstalk component in the optical coupler of the spatial coupling system. Therefore, the value as a gross value corresponding to the crosstalk for the multi-core amplification optical fiber is considered to be of a value further lower than −33 dB.

Figure 5:
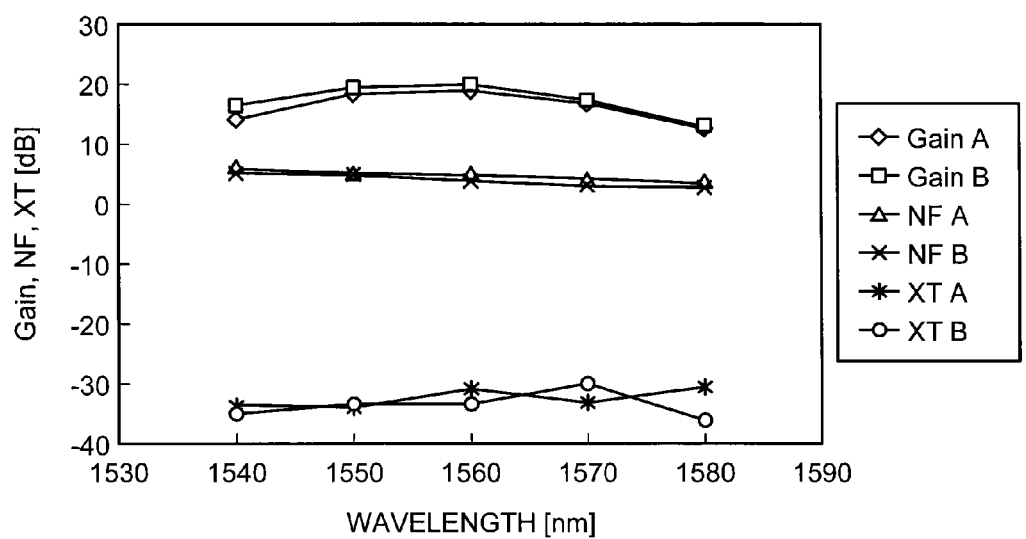
FIG. 5 is a drawing showing dependences of gain, NF, and crosstalk on wavelength.

Next, gain, noise figure (NF), and crosstalk were measured while varying the wavelength of a signal light. FIG. 5 is a drawing showing dependences of gain, NF, and crosstalk (XT) on wavelength. It should be noted that, gain and NF are of gross values for the multi-core amplification optical fiber, and crosstalk is of a net value for the multi-core optical fiber amplifier. It should be noted that, in legends, gain for Core A is described as Gain A, for example. As shown in FIG. 5, regarding both Core A and Core B, gains higher than 15 dB are obtained for a signal light at wavelengths of 1550 nm to 1570 nm, and in addition, NFs lower than 5 dB and crosstalks lower than −30 dB are obtained for a signal light at wavelengths of 1540 nm to 1580 nm.

Figure 6:
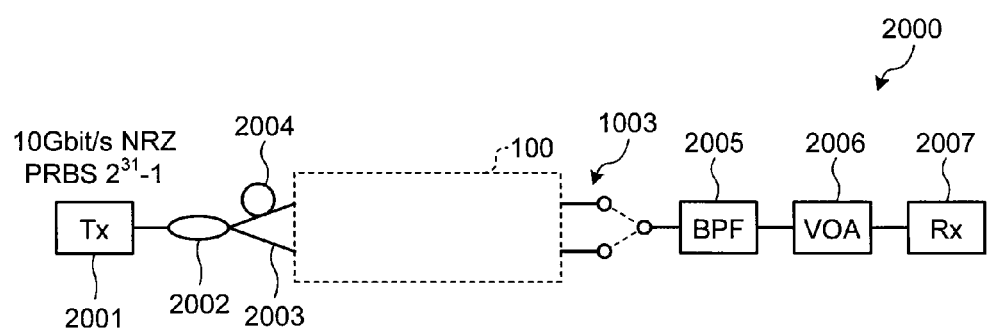
FIG. 6 is a drawing showing a measurement system for bit error rate.

Next, bit error rate for the multi-core optical fiber amplifier was measured. FIG. 6 is a drawing showing a measurement system for bit error rate. A measurement system 2000 is constituted by a signal light source 2001 capable of outputting a signal light at a wavelength of 1550 nm to which a 10 Gbit/s non-return to zero (NRZ) signal of which pseudo-random binary sequence (PRBS) is $2^{31}-1$ is superposed, a 3-dB coupler 2002 dividing a signal light outputted by the signal light source 2001 into two signal lights, an optical fiber 2003 generating two decorrelated signal lights from the divided two signal lights, an optical fiber 2004 as a delay line for 5 ns, a multi-core optical fiber amplifier 100 manufactured as an object to be measured, an optical selective switch 1003, a band-pass optical filter 2005 transmitting therethrough a signal light at a wavelength of 1550 nm, a variable optical attenuator 2006, an optical receiver 2007, and a bit-error-rate-measuring instrument, not shown in the drawings, connected to the optical receiver 2007.

The multi-core optical fiber amplifier was operated under operation condition that optical power of a signal light inputted into the multi-core amplification optical fiber is −15 dBm and optical power of the amplified signal light outputted from the multi-core amplification optical fiber is 0 dBm. In addition, bit error rate was measured by inputting signal lights into Core A and Core B used for measuring the above-described amplification characteristics.

Figure 7:
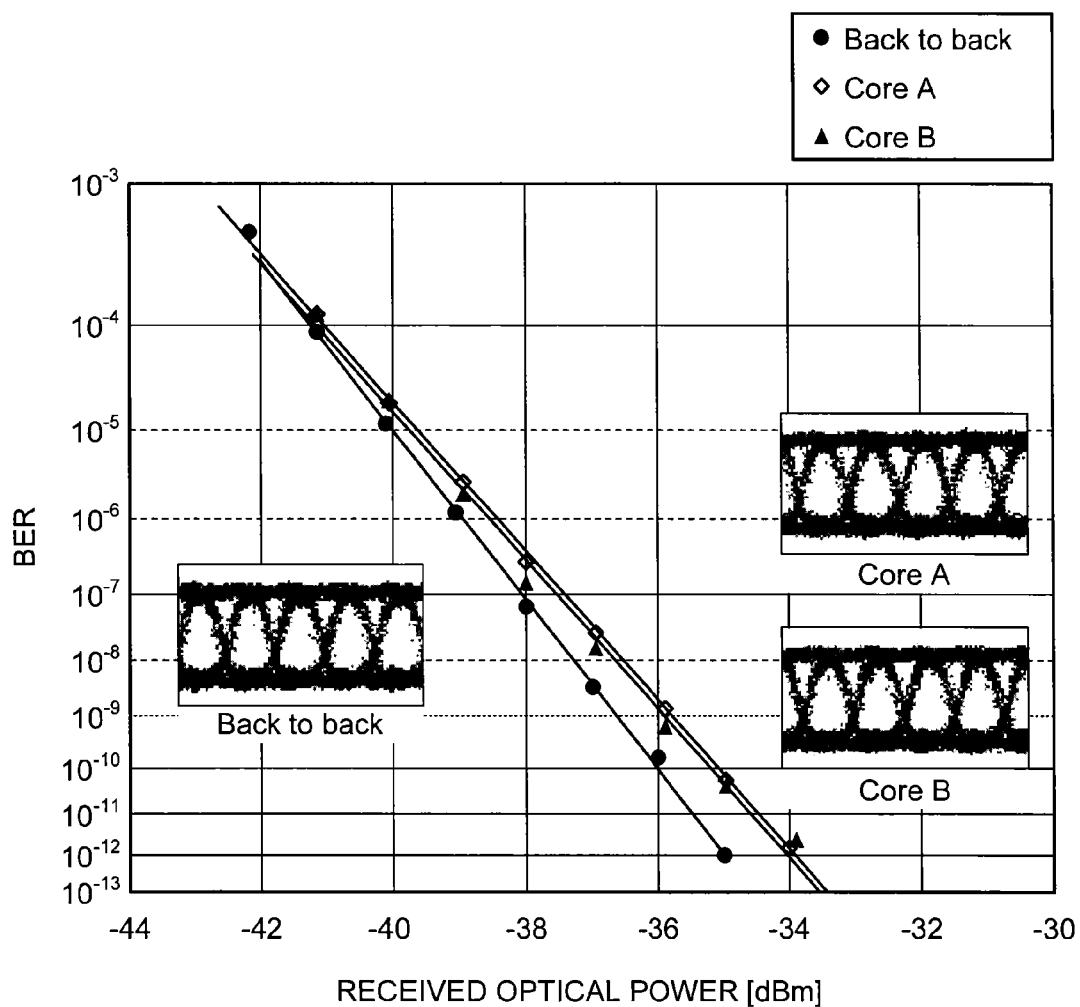
FIG. 7 is a drawing showing bit error rate characteristics.

FIG. 7 is a drawing showing bit error rate characteristics. The horizontal axis indicates received optical power by the optical receiver. As shown in FIG. 7, for Core A and Core B, power penalties relative to back-to-back condition was sufficiently lower than 1 dB when bit error rate (BER) was $10^{-11}$. In addition, although FIG. 7 shows eye patterns for a case of back-to-back condition and cases for optical amplifications by Core A and Core B, deterioration of the eye patterns by optical amplification was not observed. Hereby, it was confirmed that the manufactured multi-core optical fiber amplifier is capable of optical amplification without causing the quality of signal light to be lowered substantially.

Figure 8:
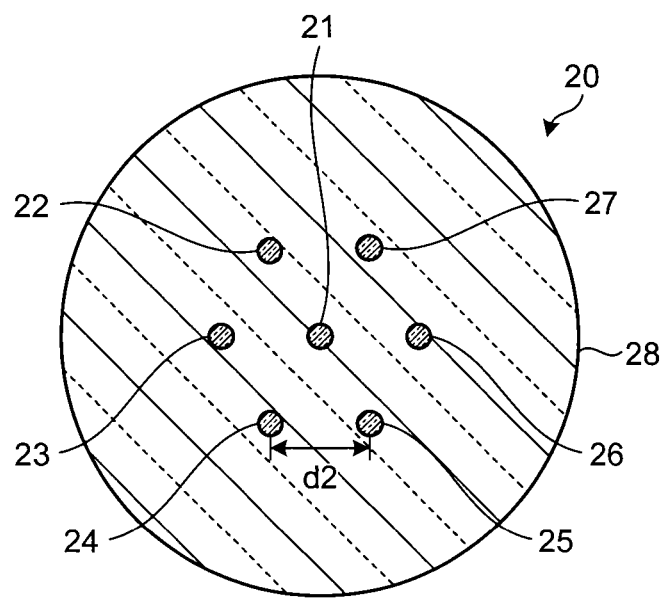
FIG. 8 is a schematic cross-sectional view of a multi-core amplification optical fiber according to an embodiment 3.

FIG. 8 is a schematic cross-sectional view of a multi-core amplification optical fiber according to an embodiment 3 of the present invention. As shown in FIG. 8, a multi-core amplification optical fiber 20 includes seven core portions 21 to 27 and a cladding portion 28 positioned at outer peripheries of the respective core portions 21 to 27.

The core portion 21 is positioned in the vicinity of a center axis of the multi-core amplification optical fiber 20, and the other core portions 22 to 27 are disposed to be positioned at substantial respective apices of a regular hexagon of which barycenter is positioned on the core portion 21. The core portions 21 to 27 are made of silica glass including Ge or the like, as a dopant increasing refractive index. The cladding portion 28 is made of pure silica glass not including a dopant adjusting refractive index. As a result, refractive index of the core portions 21 to 27 is higher than that of the cladding portion 28.

In addition, the multi-core amplification optical fiber 20 is a multi-core EDF, and the core portions 21 to 27 are doped with Er. However, rare-earth element to be doped with may be Yb, Nd, Tm or the like. The doping amount of Er is set so that, for example, loss coefficient is approximately 3.4 dB/m and small signal gain coefficient for a signal light is approximately 4.3 dB/m at a wavelength of 1550 nm. In addition, core diameters and relative refractive index differences of the core portions 21 to 27 are set so that a mode field diameter is 7.3 μm at a wavelength of 1580 nm and an average of cut-off wavelengths of the core portions 21 to 27 is 1050 nm.

As shown in FIG. 8, the inter-core distance between the core portion 24 and the core portion 25 is d2. The inter-core distances are identical as d2 between any pair of adjacent core portions 21 to 27. In addition, the inter-core distance is a distance to the extent that inter-core crosstalk of light does not affect optical characteristics of the respective core portions 21 to 27. For example, the inter-core distance is set so that the crosstalk is equal to or lower than −30 dB, more preferably equal to or lower than −40 dB for a length of the multi-core amplification optical fiber 20 in use. As described above, in order to make the crosstalk between the core portions equal to or lower than −40 dB when the mode field diameter is 7.3 μm at a wavelength of 1580 nm, the cut-off wavelength is 1050 nm, the concentration of Er to be doped is 250 ppm to 2000 ppm, the relative refractive index difference relative to the cladding portion 28 at a wavelength of 1550 nm is 0.5% to 2%, and the core diameter is 1 μm to 5 μm, it is preferable to set the inter-core distance for the core portions 21 to 27 equal to or larger than 45 μm and equal to or smaller than 60 μm. Hereby the multi-core amplification optical fiber 20 is able to optically amplify signal lights inputted into the core portions 21 to 27 while suppressing lowering of the quality of the signal light. In addition, in case that the inter-core distance was set at 45 μm in the multi-core amplification optical fiber 20, the outer diameter of the cladding portion 28 (optical fiber diameter) can be suppressed at approximately 180 μm, for example.

Next, a multi-core optical fiber amplifier using the multi-core amplification optical fiber 20 according to the embodiment 3 shown in FIG. 8 will be described as an embodiment 4 of the present invention.

Figure 9:
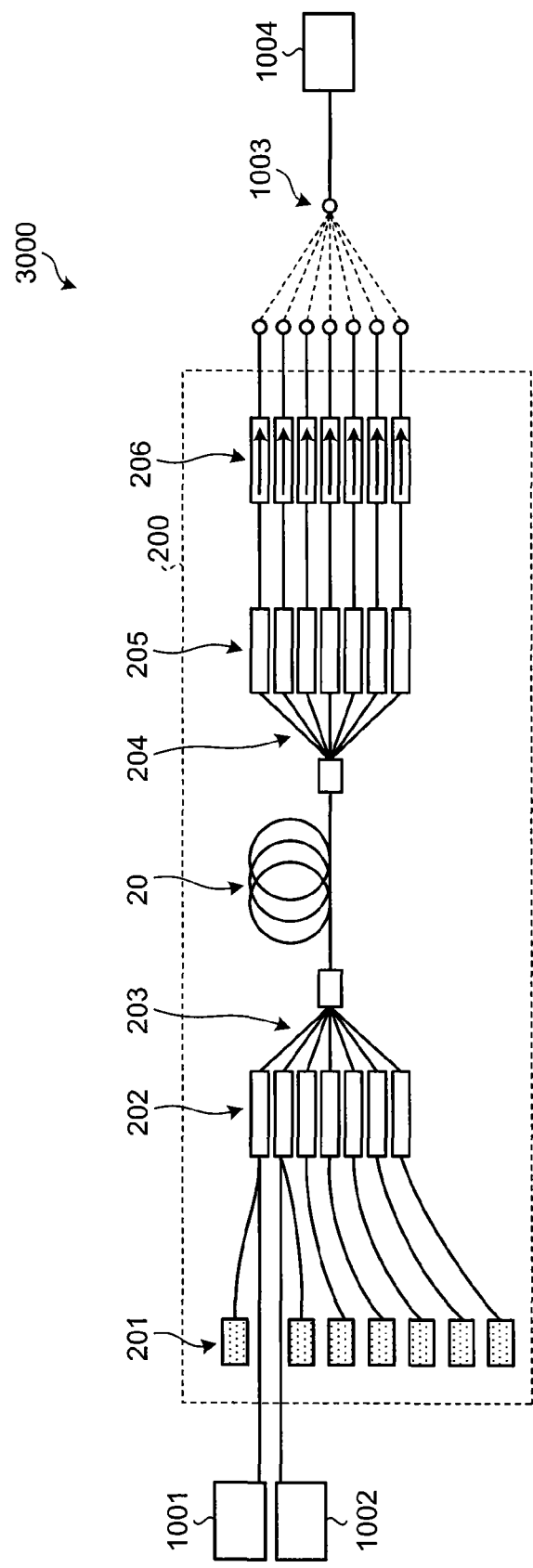
FIG. 9 is a drawing schematically showing configurations of a multi-core optical fiber amplifier according to an embodiment 4 and a measurement system measuring its optical characteristics.

FIG. 9 is a schematic diagram of a multi-core optical fiber amplifier according to the present embodiment 4 and a measurement system measuring its optical characteristics. A multi-core optical fiber amplifier 200 includes seven pumping LDs 201 as pumping light sources, seven WDM couplers 202, an optical coupler 203, the multi-core amplification optical fiber 20, an optical coupler 204, seven WDM couplers 205, and seven optical isolators 206.

In addition, similarly to the measurement system 1000, A measurement system 3000 includes the wavelength-tunable light sources 1001 and 1002, the optical selective switch 1003, and the optical spectrum analyzer 1004.

The pumping LD 201 is a semiconductor LD for example, and outputs a single mode pumping light at a wavelength of 980 nm. It should be noted that, the pumping LD 201 may output a pumping light, at another wavelength, e.g., a wavelength of 1480 nm or the like, which is capable of optically pumping the doped rare-earth element.

The WDM coupler 202 is provided with an input-side optical fiber port of a single mode optical fiber into which a signal light is inputted from outside. It should be noted that, in FIG. 9, input-side optical fiber ports connected to the wavelength-tunable light sources 1001 and 1002 are shown only for the two WDM couplers 202 in an upper section of the drawing. The WDM coupler 202 multiplexes each pumping light outputted from the pumping LD 201 with a signal light outputted from an external signal light source (for example, the wavelength-tunable light sources 1001 and 1002 shown in FIG. 9) and outputs the multiplexed light to an output-side optical fiber port of a single mode optical fiber positioned at a right-hand side of the drawing relative to the WDM coupler 202.

The optical coupler 203 is constituted by an optical fiber bundle formed by bundling seven single mode optical fibers. It should be noted that the outer diameters of the seven optical fibers are set at values which are approximately equal to the inter-core distances of the core portions 21 to 27 of the multi-core amplification optical fiber 20. The seven optical fibers of the optical coupler 203 are connected, at one side of their ends, with the output-side optical fiber ports of the seven WDM couplers 202 respectively, and the bundled ends of the seven optical fibers are, at the other side of their ends, connected to an input side of end portion of the multi-core amplification optical fiber 20 (left-hand side of the drawing) so that optical axes of the core portions coincide with the core portions 21 to 27.

The optical coupler 203 is configured to couple optically each multiplexed light, i.e. a signal light and a pumping light multiplexed by the WDM coupler 202, with different core portions of the multi-core amplification optical fiber 20 respectively. Hereby, the respective core portions 21 to 27 of the multi-core amplification optical fiber 20 are pumped optically, and the optically pumped respective core portions 21 to 27 propagate the signal lights while amplifying the signal lights optically. As described above, the multi-core optical fiber amplifier 200 adopts forward pumping scheme.

In addition, the multi-core optical fiber amplifier 200 adopts core-pumping method (end-pumping method) in which the optical coupler 203 couples the pumping lights to the core portions 21 to 27 respectively from the end of the multi-core amplification optical fiber 20. The core-pumping method has an effect that the length of the multi-core amplification optical fiber 20 necessary for obtaining desirable amplification characteristics can be shorter than that of cladding-pumping method (side-pumping method) adopted by a double-cladding-type optical fiber amplifier. For example, sufficient gain characteristics can be obtained if the multi-core amplification optical fiber 20 is 2 m to 20 m in length.

Similarly to the optical coupler 203, the optical coupler 204 is constituted by an optical fiber bundle formed by bundling seven single-mode optical fibers. The seven optical fibers of the optical coupler 204 are connected, at one side of their ends, with input-side optical fiber ports of the seven WDM couplers 205 respectively, and the bundled ends of the seven optical fibers are, at the other side of their ends, connected to an output side of end portion of the multi-core amplification optical fiber 20 (right-hand side of the drawing) so that optical axes of the core portions coincide with the core portions 21 to 27. It should be noted that, in some cases, the optical coupler 203 is called as an optical-fiber-bundle-type fan-in and the optical coupler 204 is called as an optical-fiber-bundle-type fan-out.

The optical coupler 204 makes the signal lights amplified optically by, and outputted from, the respective core portions 21 to 27 of the multi-core amplification optical fiber 20 inputted into the WDM couplers 205 respectively.

The WDM coupler 205 and the optical isolator 206 make the inputted signal lights pass therethrough and output the signal lights from the multi-core optical fiber amplifier 200.

The optical selective switch 1003 selects one of the signal lights outputted from the optical isolators 206 arbitrarily and outputs the selected one of the signal lights to the optical spectrum analyzer 1004. Hereby the optical spectrum analyzer 1004 can measure the spectrum of the inputted signal light.

Since The multi-core optical fiber amplifier 200 uses the optical couplers 203 and 204 which are constituted by the optical fiber bundles and in good crosstalk characteristics, a low crosstalk value for the whole multi-core optical fiber amplifier 200 is realized.

Next, a multi-core optical fiber amplifier and a measurement system having a configuration similar to that of FIG. 9 were manufactured, and optical amplification characteristics of the multi-core optical fiber amplifier were measured.

Figure 10:
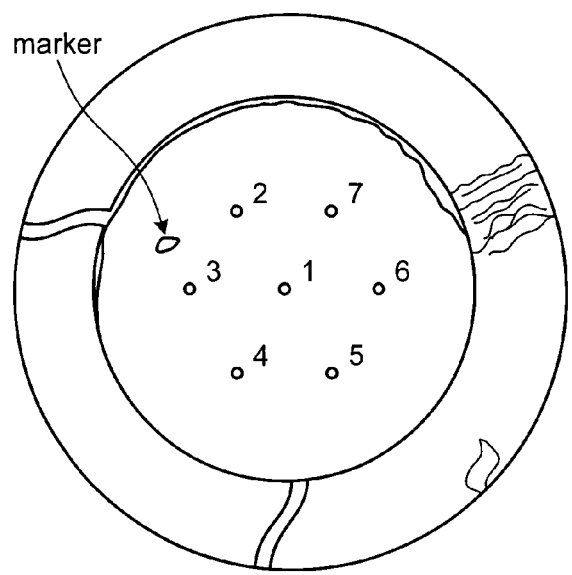
FIG. 10 is a drawing schematically showing a photographed cross section of a multi-core amplification optical fiber used for a produced multi-core optical fiber amplifier.

FIG. 10 is a drawing schematically showing a photographed cross section of the multi-core amplification optical fiber used for the produced multi-core optical fiber amplifier. In the drawing, "marker" indicates a marker formed to specify positional relationship of the core portions. The doping amount of Er of this multi-core amplification optical fiber was set so that loss coefficient at a wavelength of 1550 nm is approximately 3.4 dB/m and small signal gain coefficient for a signal light is approximately 4.3 dB/m. In addition, core diameters and relative refractive index differences of the respective seven core portions were set so that a mode field diameter is 7.3 μm at a wavelength of 1580 nm, and an average of cut-off wavelengths is 1050 nm. In addition, respective inter-core distances were set at 45 μm. In addition, the length of the multi-core amplification optical fiber was set at 16 m.

In addition, as shown in FIG. 10, for the following description, the core portions are given numbers 1 to 7. For example, the center one of the core portions numbered "1" is described as Core 1.

Next, various experiments were performed to confirm the crosstalk characteristics of the manufactured multi-core optical fiber amplifier.

(Experiment 1)

In Experiment 1, at first, a signal light was inputted into Core 1. Along with that, spectra of output from Core 1 were measured for cases where a pumping light was inputted into only Core 1 (Experiment 1-1), a pumping light was inputted into only Core 2 (Experiment 1-2), and pumping lights were inputted into six core portions, i.e., Core 2 to Core 7 (which are other than Core 1) (Experiment 1-3). It should be noted that the signal light (signal 1) was set at a wavelength of 1550 nm and at a power of −15 dBm. The pumping light was set at a wavelength of 980 nm and at a power of approximately 40 mW. In addition, the resolution of the optical spectrum analyzer was set at 0.1 nm.

Figure 11:
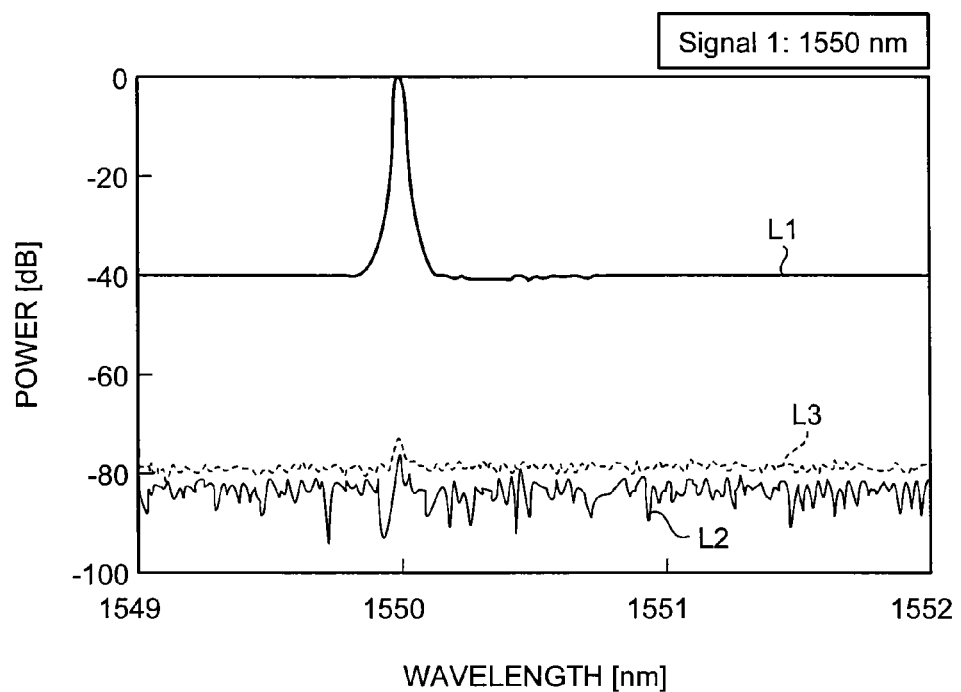
FIG. 11 is a drawing showing the result of measurement in Experiment 1.

FIG. 11 is a drawing showing a result of measurement in Experiment 1. Lines L1, L2, and L3 indicate the results of Experiments 1-1, 1-2, and 1-3 respectively. It should be noted that the vertical axis shows relative power.

The line L1 indicates that the signal light inputted into Core 1 was amplified optically and outputted in Experiment 1-1. It should be noted that, as indicated by the line L1, at a wavelength other than the peak at a wavelength of 1550 nm, an amplified spontaneous emission (ASE) light outputted from Core 1 is measured at an optical power level of approximately −40 dB.

The line L2 indicates that the power level of the light outputted from Core 1 is approximately equal to or lower than −80 dB in Experiment 2. This indicates that, since the crosstalk value between Core 1 and Core 2 is sufficiently low, the ASE light generated in Core 2 by inputting the pumping light into Core 2 is outputted very little from Core 1.

On the other hand, the line L3 also indicates that, in Experiment 1-3, a power level of light outputted from Core 1 is approximately −80 dB. This also indicates that, since the crosstalk value between Core 1 and other core portions is sufficiently low, the ASE light generated in the other core portions by inputting the pumping lights into the other core portions is outputted very little from Core 1.

(Experiment 2)

In Experiment 2, signal lights were inputted into Core 1 and Core 2. Along with that, spectra of output from Core 2 were measured for cases where a pumping light was inputted into only Core 2 (Experiment 2-1), pumping lights were inputted into all the core portions other than Core 2 (Experiment 2-2), and a pumping light was inputted into only Core 1 (Experiment 2-3). It should be noted that the signal light (signal 1) was set at a wavelength of 1550 nm and at a power of −15 dBm for Core 1. The signal light (Signal 2) was set at a wavelength of 1551 nm and at a power of −15 dBm for Core 2. The pumping light was set at a wavelength of 980 nm and at a power of approximately 40 mW. In addition, the resolution of the optical spectrum analyzer was set at 0.1 nm.

Figure 12:
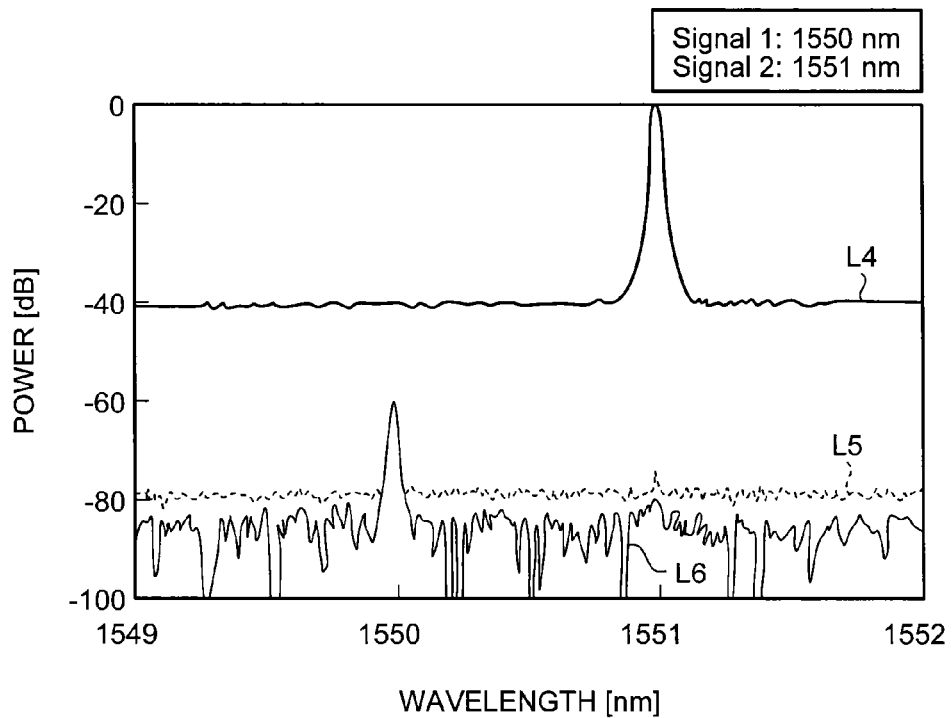
FIG. 12 is a drawing showing the result of measurement in Experiment 2.

FIG. 12 is a drawing showing the result of measurement in Experiment 2. Lines L4, L5, and L6 indicate the results of Experiments 2-1, 2-2, and 2-3 respectively. It should be noted that the vertical axis shows relative power.

The line L4 indicates that the signal light inputted into Core 2 was amplified optically and outputted in Experiment 2-1. As indicated by the line L4, at a wavelength other than the peak at a wavelength of 1551 nm, an ASE light outputted from Core 2 is measured at an optical power level of approximately −40 dB.

The line L5 indicates that the power level of the light outputted from Core 2 is approximately −80 dB at almost all of wavelengths in Experiment 2-2. This indicates that, similarly to Experiment 1, the crosstalk value between Core 2 and the other core portions is sufficiently low.

On the other hand, the line L6 also indicates that the power level of the light outputted from Core 2 is approximately −80 dB at almost all of wavelengths in Experiment 3-3. This also indicates that, similarly to Experiment 1, the crosstalk value between Core 2 and Core 1 is sufficiently low. However, in Experiments 2-2 and 2-3, a signal light from Core 1 at a wavelength of 1550 nm is measured. This is because the signal light inputted into Core 1 was amplified, thus the optical power was in high degree so that a signal light component transferred to Core 2 was not buried under noise level.

(Experiment 3)

In Experiment 3, signal lights were inputted into Core 1 and Core 2. Along with that, a spectrum of output from Core 2 was measured while inputting pumping lights into Core 1 and Core 2 and varying the power of the pumping light for Core 2. It should be noted that the signal light (signal 1) for Core 1 was set at a wavelength of 1550 nm and at a power of −15 dBm. The signal light (signal 2) for Core 2 was set at a wavelength of 1551 nm and at a power of −15 dBm. The pumping light for Core 1 was set at a wavelength of 980 nm and at a power of approximately 66 mW. The pumping light for Core 2 was set at a wavelength of 980 nm and at a power of approximately 0 mW, 16 mW, 24 mW, 37 mW, or 62 mW. In addition, the resolution of the optical spectrum analyzer was set at 0.1 nm.

Figure 13:
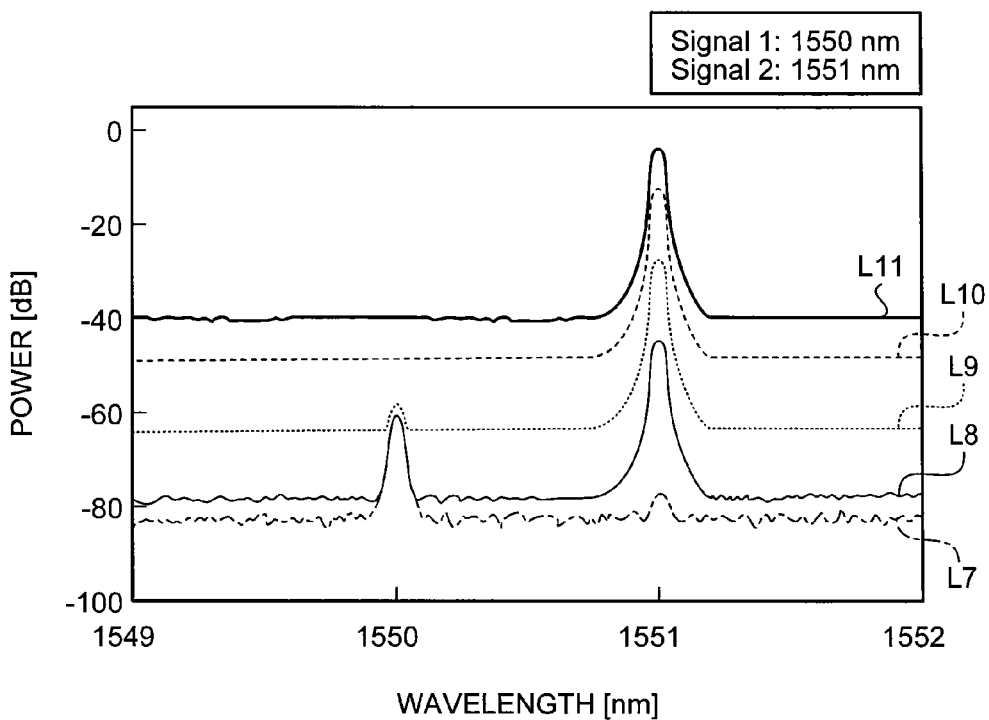
FIG. 13 is a drawing showing the result of measurement in Experiment 3.

FIG. 13 is a drawing showing the result of measurement in Experiment 3. Lines L7, L8, L9, L10, and L11 show cases where powers of the pumping lights inputted into Core 2 are 0 mW, 16 mW, 24 mW, 37 mW, and 62 mW respectively. It should be noted that the vertical axis indicates relative power.

According to the lines L7 to L11, along with increase in the optical power of pumping inputted into Core 2, the power of the signal light (Signal 2) at a wavelength of 1551 nm increases. However, it is shown that the signal light component (Signal 1) observed at a wavelength of 1550 nm which is transferred from Core 1 to Core 2 is buried under the ASE light generated in Core 2 and is not observed at the pumping light power of 37 mW. Herein, although relative power of the observed signal 1 is approximately −60 dB, when the power of the ASE light generated in Core 2 increases to a degree of burying the observed signal 1, the relative power of Signal 2 is equal to or higher than approximately −20 dB. Therefore, the crosstalk between Core 1 and Core 2 is considered to be lower than −40 dB.

(Measurement 1 of Crosstalk)

Next, inter-core-portion optical crosstalk was measured by using a signal light at a wavelength of 1550 nm. It should be noted that, as shown in FIG. 12, since the ASE light affects measurement of crosstalk, the measurement was performed under the condition that the measurement is less affected by the ASE light by setting the resolution of the optical spectrum analyzer at 0.02 nm. It should be noted that the measurement was performed in a state that the multi-core amplification optical fiber was wound at a bending diameter of 75 mm. In addition, a signal light to be inputted was set at a wavelength of 1550 nm and at a power of 0 dBm. The power of the pumping light was adjusted so that the gross gain of the multi-core amplification optical fiber is 4 dB. In addition, as a crosstalk value, a value was used which defines a ratio of a signal light outputted from a core portion which is other than a specific core portion relative to the power of the signal light inputted into the specific core portion.

Figure 14:
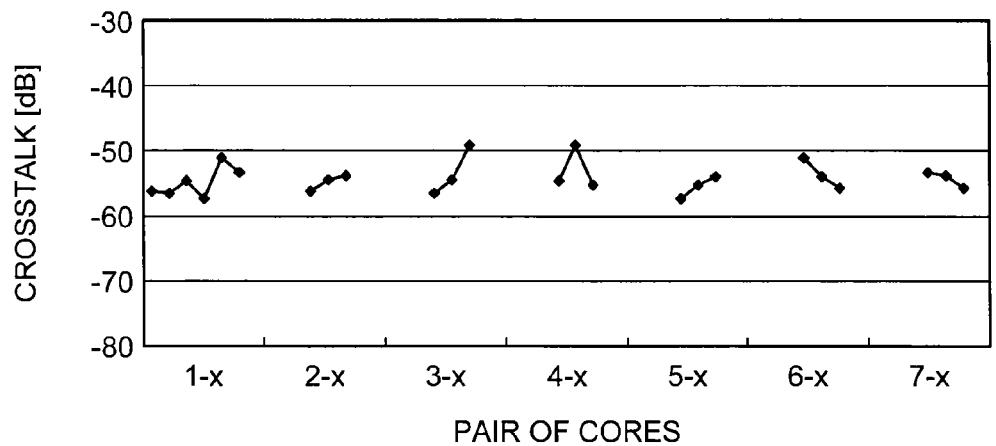
FIG. 14 is a drawing showing crosstalk.

FIG. 14 is a drawing showing crosstalk. The horizontal axis shows a pair of cores. For example, data as to six points corresponding to "1-x" are values of crosstalk between Core 1 and its adjacent Core 2 to Core 7 respectively. In addition, data as to three points corresponding to "2-x" are values of crosstalk between Core 2 and its adjacent Core 1, Core 3, and Core 7, respectively. Similarly, data as to three points corresponding to "3-x" to "7-x" respectively are values of crosstalk between Cores 3 to 7 and their adjacent three core portions.

As shown in FIG. 14, it was confirmed that approximately −48 dB to −57 dB, which are equal to or lower than −40 dB, of low crosstalk values were obtained at any one of the core portions.

(Measurement 2 of Crosstalk)

Next, inter-core-portion optical crosstalk was measured by using a signal light at a wavelength of 1640 nm, which is a wavelength affected very little by optical absorption of Er with which the core portions are doped (the optical loss is 1 dB per length of 16 m).

Figure 15:
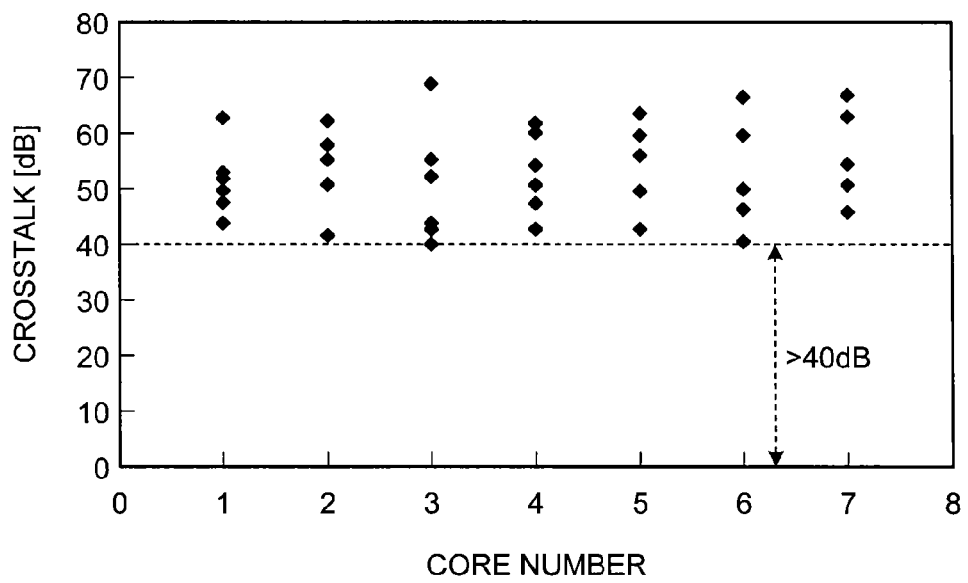
FIG. 15 is a drawing showing absolute values of crosstalk.

FIG. 15 is a drawing showing absolute values of crosstalk. The horizontal axis shows core number. For example, the core number "1" means Core 1. Crosstalk of each core number of core portion relative to other six core portions is indicated by six data points.

As shown in FIG. 15, an absolute value of crosstalk in any one of the core portions was equal to or higher than 40 dB, that is, the crosstalk was equal to or lower than −40 dB.

Figure 16:
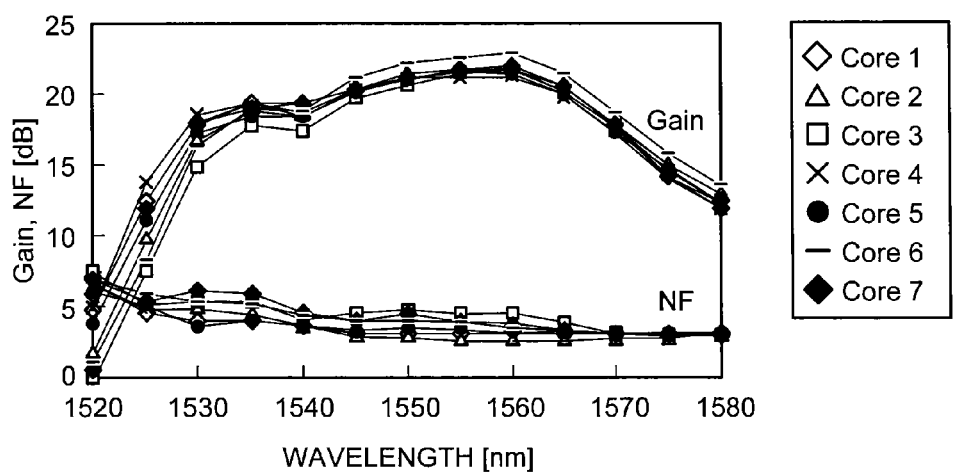
FIG. 16 is a drawing showing dependences of gain and NF on wavelength.

Next, gain and noise figure (NF) were measured by setting the optical power of a signal light to be inputted into the multi-core amplification optical fiber at −13 dBm and while varying the wavelength. FIG. 16 is a drawing showing dependences of gain and NF on wavelength. It should be noted that gain and NF are gross values relative to the multi-core amplification optical fiber.

As shown in FIG. 16, for any one of Core 1 to Core 7, gain higher than 15 dB and NF within 7 dB±0.3 dB was obtained for a signal light at a wavelength of 1530 nm to 1560 nm. In addition, dependence of gain on wavelength within a range of 1530 nm to 1560 nm of wavelength was within 1 dB.

Figure 17:
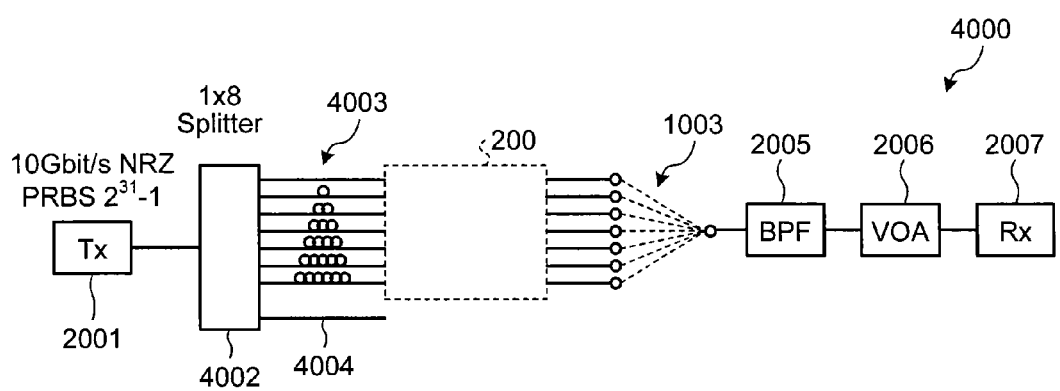
FIG. 17 is a drawing showing a measurement system for bit error rate.

Next, bit error rate for the multi-core optical fiber amplifier was measured. FIG. 17 is a drawing showing a measurement system for bit error rate. A measurement system 4000 is constituted by a signal light source 2001 capable of outputting a signal light, at a wavelength of 1550 nm, to which a 10 Gbit/s NRZ signal of which PRBS length is $2^{31}-1$ is superposed, a 1×8-splitter 4002 dividing a signal light outputted from the signal light source 2001 into eight signal lights, an optical fiber 4003 having a delay line generating seven signal lights, decorrelated to each other, from the divided eight signal lights, and the multi-core optical fiber amplifier 200 manufactured as an object to be measured, the optical selective switch 1003, a band-pass optical filter 2005 transmitting a signal light at a wavelength of 1550 nm therethrough, a variable optical attenuator 2006, an optical receiver 2007, and a bit-error-rate-measuring instrument, not shown in the drawings, connected to the optical receiver 2007. It should be noted that the optical fiber 4004 is a dummy optical fiber for transmitting therethrough a signal light, not inputted into the multi-core optical fiber amplifier 200, of the eight signal lights divided by the 1×8-splitter 4002.

The multi-core optical fiber amplifier was operated under operation condition that optical power of each signal light inputted into the multi-core amplification optical fiber is −15 dBm and optical power of the amplified signal light outputted from, the multi-core amplification optical fiber is 0 dBm. The power in this state of each pumping light inputted into the multi-core amplification optical fiber was approximately 40 mW.

Figure 18:
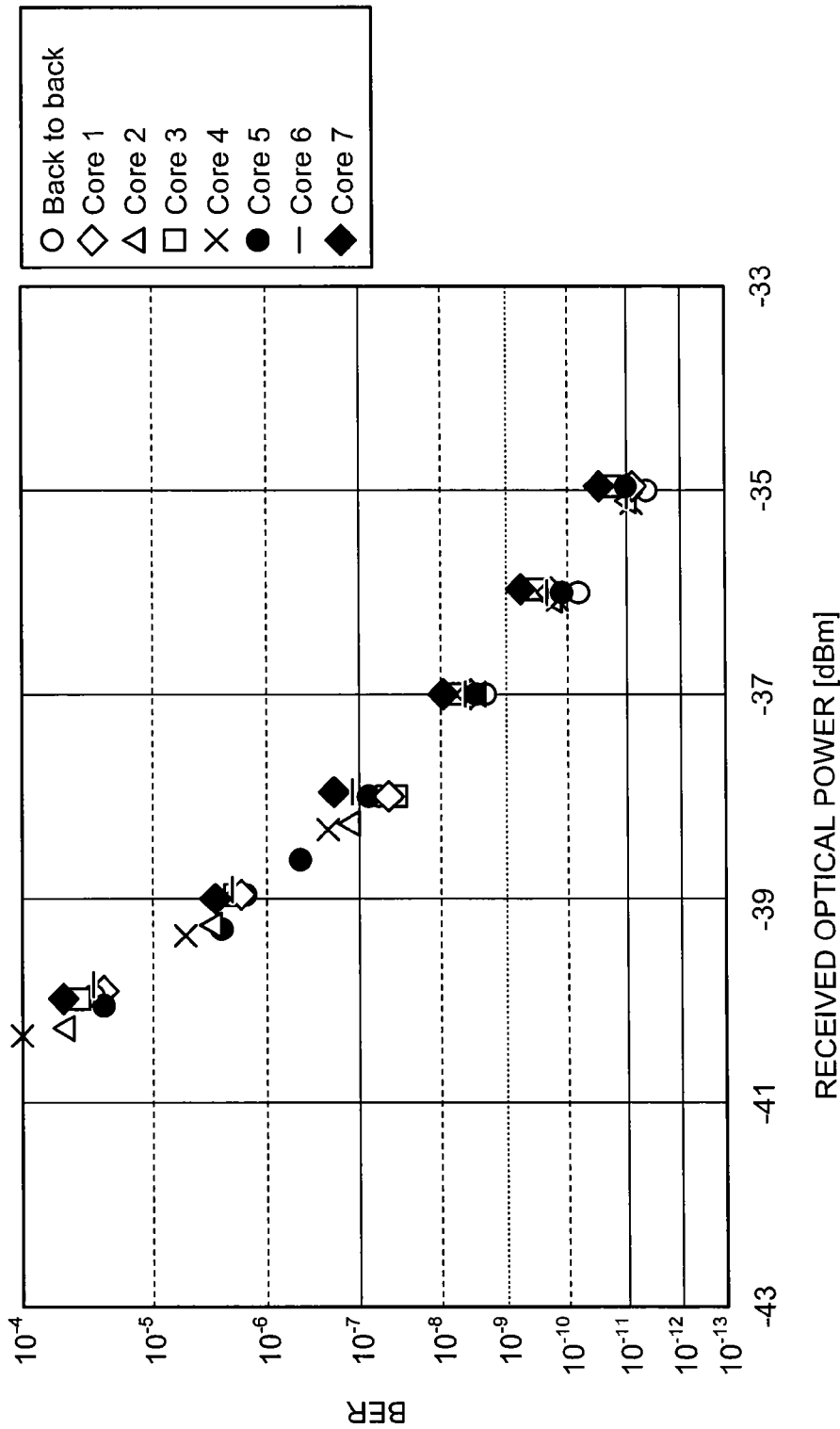
FIG. 18 is a drawing showing bit error rate characteristics.

FIG. 18 is a drawing showing bit error rate characteristics. The horizontal axis shows received optical power by the optical receiver. As shown in FIG. 18, for any one of Core 1 to Core 7, power penalties relative to back-to-back condition was lower than 0.5 dB when BER was $10^{-9}$. In addition, it was free from error in case where BER was $10^{-11}$. Hereby it was confirmed that the manufactured multi-core optical fiber amplifier is capable of optical amplification without causing the quality of the signal light to be lowered substantially.

Figure 19:
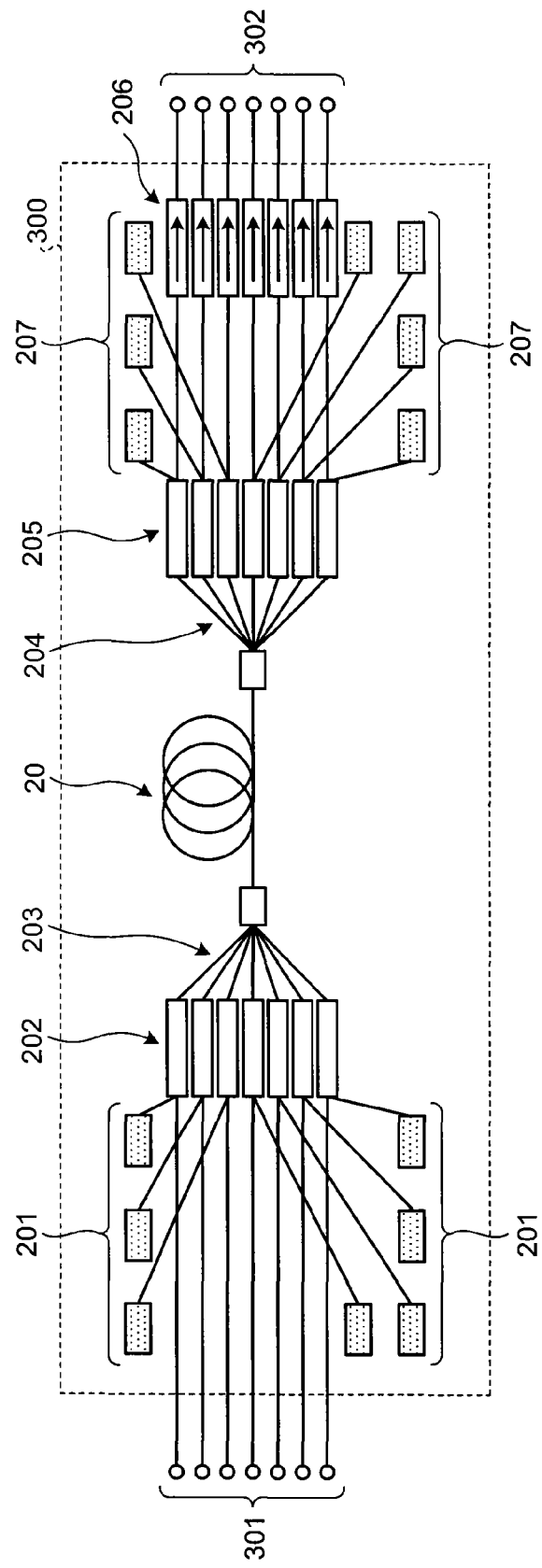
FIG. 19 is a view schematically showing a configuration of a multi-core optical fiber amplifier according to an embodiment 5.

FIG. 19 is a view schematically showing a configuration of a multi-core optical fiber amplifier according to an embodiment 5. In a multi-core optical fiber amplifier 300, seven pumping LDs 207 having characteristics similar to those of the pumping LD 201 are further included in addition to the configuration of the multi-core optical fiber amplifier 200 according to the embodiment 4. The seven pumping LDs 207 are connected with the seven WDM couplers 205 respectively, and output pumping lights for pumping the multi-core amplification optical fiber 20 backwardly via the WDM couplers 205. It should be noted that reference sign 301 indicates input-side optical fiber ports of the WDM couplers 202. Reference sign 302 indicates output-side optical fiber ports of the optical isolators 206.

Since the multi-core optical fiber amplifier 300 adopts bi-directional pumping scheme using both forward pumping scheme and backward pumping scheme, low-noise, high-output, and high-gain characteristics are realized. In addition, since the multi-core optical fiber amplifier 300 adopts the core-pumping method, the length of the multi-core amplification optical fiber 20 for use can be shorter.

Next, a multi-core optical fiber amplifier having configuration similar to that of FIG. 19 was manufactured, and its optical amplification characteristics were measured.

Figure 20:
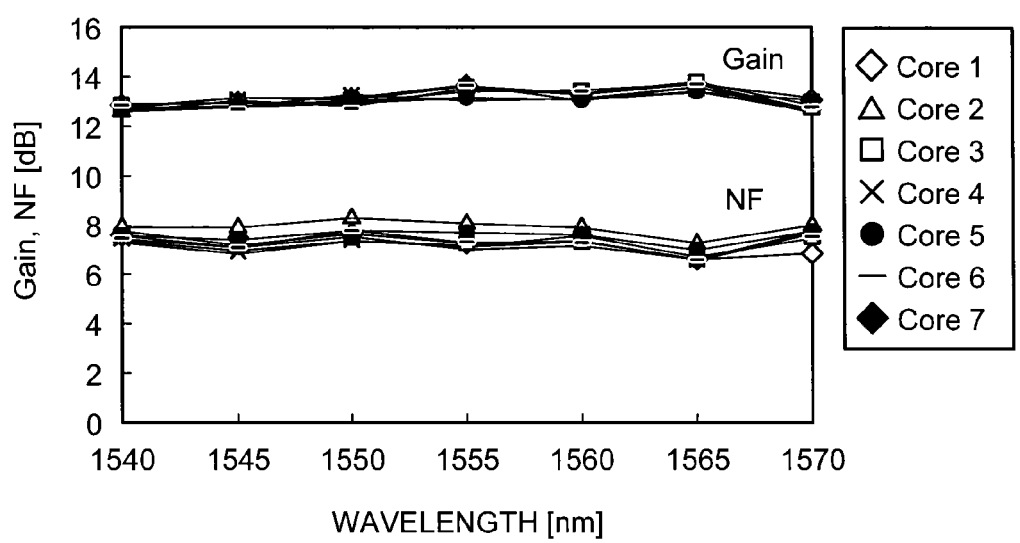
FIG. 20 is a drawing showing dependences of gain and NF on wavelength.

FIG. 20 is a drawing showing dependences of gain and NF of the manufactured multi-core optical fiber amplifier on wavelength. It should be noted that gain and NF are gross values relative to the multi-core amplification optical fiber. In addition, the multi-core optical fiber amplifier was operated under operation condition that optical power of each signal light inputted into the multi-core amplification optical fiber is 0 dBm and optical power of the amplified signal light outputted from the multi-core amplification optical fiber is approximately 13 dBm. The power in this state of each pumping light inputted into the multi-core amplification optical fiber was approximately 20 mW at the pumping LD at a forward pumping side, and approximately 100 mW at the pumping LD at a backward pumping side. As shown in FIG. 20, for any one of Core 1 to Core 7, 6.5 dB to 8.3 dB of excellent NF is obtained for a signal light at a wavelength of 1545 nm to 1560 nm. In addition, dependence of gain on wavelength within a range of wavelength of 1545 nm to 1560 nm was within 1 dB.

Although, among a plurality of the core portions in the above-described embodiments, doping concentrations of rare-earth element, relative refractive index differences and core diameters are identical, inter-core optical crosstalk can be further reduced by differentiating these parameters per core portion.

For example, among the core portions, the doping concentration of Er may be differentiated by 300 ppm to 1750 ppm. It is preferable to set the difference of the doping concentrations within a range that exerts decrease in crosstalk and prevents inter-core-portion gain deviation from increasing.

In addition, the relative refractive index difference Δ may be differentiated among the core portions by 0.1% to 1.5%. It is preferable to set the difference of the relative refractive index difference Δ within a range that exerts decrease in crosstalk and maintains single-mode transmission characteristics of the core portions at a wavelength of the pumping light.

In addition, the core diameters may be differentiated among the core portions by 1 μm to 4 μm. It is preferable to set the core diameters within a range that exerts decrease in crosstalk and maintains single-mode transmission characteristics of the core portions at a wavelength of the pumping light. In addition, crosstalk can be decreased also by decreasing the core diameter.

It should be noted that, although the number of the core portions in the multi-core amplification optical fiber is three or seven in the above-described embodiments, the present invention is not limited to this, and the number of the core portions may be of a value of integer which is equal to or greater than two, for example, nineteen or the like.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. A multi-core amplification optical fiber comprising:
a plurality of core portions doped with a rare-earth element; and
a cladding portion positioned at an outer periphery of each of the core portions and including refractive index lower than refractive index of each of the core portions, wherein when a concentration of the rare-earth element doped to each of the core portions is 250 ppm to 2000 ppm, a relative refractive index difference Δ of each of the core portions relative to the cladding portion is 0.5% to 2% at a wavelength of 1550 nm, and a core diameter of each of the core portions is 1 μm to 5 μm, a separation distance between each of the core portions and adjacent one of the core portions is set at equal to or larger than 30 μm and at equal to or smaller than 60 μm so that a crosstalk of light between the adjacent core portions is equal to or lower than −30 dB, and among the core portions being adjacent to each other, the concentration of the doped rare-earth element is differentiated by 300 ppm to 1750 ppm.

2. The multi-core amplification optical fiber according to claim 1, wherein the separation distance is set at equal to or longer than 45 μm and equal to or shorter than 60 μm so that the crosstalk is equal to or lower than −40 dB.

3. The multi-core amplification optical fiber according to claim 1, wherein the rare-earth element is erbium.

4. The multi-core amplification optical fiber according to claim 3, wherein, when a signal light is inputted at a wavelength of 1550 nm, the signal light is amplified optically so that a gain is equal to or higher than 15 dB and a noise figure is equal to or lower than 7 dB.

5. The multi-core amplification optical fiber according to claim 3, wherein, when a signal light is inputted at a wavelength of 1550 nm, the signal light is amplified optically so that an intensity outputted from the multi-core amplification optical fiber is equal to or higher than 13 dBm and a noise figure is equal to or lower than 8.3 dB.

6. A multi-core optical fiber amplifier using a multi-core amplification optical fiber, the multi-core amplification optical fiber comprising:

a plurality of core portions doped with a rare-earth element; and a cladding portion positioned at an outer periphery of each of the core portions and including refractive index lower than refractive index of each of the core portions, wherein when a concentration of the rare-earth element doped to each of the core portions is 250 ppm to 2000 ppm, a relative refractive index difference Δ of each of the core portions relative to the cladding portion is 0.5% to 2% at a wavelength of 1550 nm, and a core diameter of each of the core portions is 1 μm to 5 μm, a separation distance between each of the core portions and adjacent one of the core portions is set at equal to or larger than 30 μm and at equal to or smaller than 60 μm so that a crosstalk of light between the adjacent core portions is equal to or lower than −30 dB, and among the core portions being adjacent to each other, the concentration of the doped rare-earth element is differentiated by 300 ppm by 1750 ppm.

7. The multi-core optical fiber amplifier according to claim 6, comprising:

a plurality of pumping light sources outputting pumping lights to pump the rare-earth element optically; and an optical coupler coupling each of the pumping lights outputted from each of the pumping light sources with each of the core portions optically.

8. The multi-core optical fiber amplifier according to claim 7, wherein the optical coupler is constituted by an optical coupling system.

9. The multi-core optical fiber amplifier according to claim 7, wherein the optical coupler is constituted by an optical fiber bundle.

10. The multi-core optical fiber amplifier according to claim 7 adopting at least one of a forward pumping method and a backward pumping scheme.

* * * * *